United States Patent
Jones et al.

(10) Patent No.: US 11,686,493 B2
(45) Date of Patent: Jun. 27, 2023

(54) DIGITAL HVAC CONTROLLER FOR NAVIGATING INFORMATION BASED ON TWO OR MORE INPUTS

(71) Applicant: Ademco Inc., Golden Valley, MN (US)

(72) Inventors: Christopher R. Jones, Minneapolis, MN (US); Jaymeson Tucker, Minneapolis, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 17/001,433

(22) Filed: Aug. 24, 2020

(65) Prior Publication Data

US 2021/0172636 A1 Jun. 10, 2021

Related U.S. Application Data

(60) Provisional application No. 62/943,729, filed on Dec. 4, 2019.

(51) Int. Cl.

| | |
|---|---|
| *F24F 11/52* | (2018.01) |
| *G06F 3/0485* | (2022.01) |
| *G06F 3/0488* | (2022.01) |
| *G06F 3/0362* | (2013.01) |
| *G06F 3/0482* | (2013.01) |
| *G06F 3/0484* | (2022.01) |
| *G06F 3/04847* | (2022.01) |

(52) U.S. Cl.
CPC ............ *F24F 11/52* (2018.01); *G06F 3/0362* (2013.01); *G06F 3/0482* (2013.01); *G06F 3/0485* (2013.01); *G06F 3/0488* (2013.01); *G06F 3/04847* (2013.01)

(58) Field of Classification Search
CPC ...... F24F 11/52; G06F 3/0362; G06F 3/0482; G06F 3/04847; G06F 3/0485; G06F 3/0488
See application file for complete search history.

(56) References Cited

U.S. PATENT DOCUMENTS

| 4,768,706 A * | 9/1988 | Parfitt .................... G01D 7/002 236/94 |
| 7,264,175 B2 * | 9/2007 | Schwendinger ... G05D 23/1902 236/94 |
| 7,608,803 B2 * | 10/2009 | Jerovsek ............ G05D 23/1902 340/584 |

(Continued)

*Primary Examiner* — Daeho D Song
(74) *Attorney, Agent, or Firm* — Greenberg Traurig, LLP; Ryan D. Sharp; David J. Dykeman

(57) ABSTRACT

In some examples, a device can control one or more heating, ventilation, and air conditioning (HVAC) components within a building and control a digital user interface. The device includes a dial, the digital user interface, and processing circuitry. The processing circuitry is configured to scroll, in response to detecting a set of user inputs to one or both of the digital user interface and the dial, through a sequence of carousel screens for display on the digital user interface and display, on the digital user interface after a period of time following a most recent user input of the set of user inputs, a default carousel screen of the sequence of carousel screens. Additionally, the processing circuitry is configured to display, on the digital user interface, an idle screen corresponding to the default carousel screen of the sequence of carousel screens.

16 Claims, 6 Drawing Sheets

(56) References Cited

U.S. PATENT DOCUMENTS

| | | | |
|---|---|---|---|
| 8,195,313 B1* | 6/2012 | Fadell | F24F 11/67 |
| | | | 236/1 C |
| 8,868,219 B2 | 10/2014 | Fadell et al. | |
| 9,105,180 B2* | 8/2015 | McKinley | G06F 3/0488 |
| 9,223,323 B2 | 12/2015 | Matas et al. | |
| 10,013,861 B2* | 7/2018 | Fadell | G08B 21/22 |
| 10,078,319 B2* | 9/2018 | Matsuoka | H04L 12/40013 |
| 10,779,085 B1* | 9/2020 | Carrigan | H04L 12/2816 |
| 11,162,699 B1* | 11/2021 | Jones | G06F 3/147 |
| 2002/0054151 A1* | 5/2002 | Inomata | G06F 1/1626 |
| | | | 715/810 |
| 2002/0144026 A1* | 10/2002 | Dunlap | G06F 3/0481 |
| | | | 710/16 |
| 2004/0233239 A1* | 11/2004 | Lahdesmaki | H04N 21/47 |
| | | | 715/810 |
| 2005/0081164 A1* | 4/2005 | Hama | G06F 3/04855 |
| | | | 715/830 |
| 2005/0193340 A1* | 9/2005 | Amburgey | G06F 3/04817 |
| | | | 715/825 |
| 2005/0273553 A1* | 12/2005 | Boucard | G11B 19/02 |
| | | | 711/112 |
| 2007/0093937 A1* | 4/2007 | Reasoner | G06F 3/0481 |
| | | | 700/245 |
| 2007/0097074 A1* | 5/2007 | Irimajiri | H04M 1/0202 |
| | | | 345/157 |
| 2007/0271528 A1* | 11/2007 | Park | H04M 1/72427 |
| | | | 715/830 |
| 2008/0022228 A1* | 1/2008 | Kwon | G06F 3/04817 |
| | | | 715/810 |
| 2010/0107019 A1* | 4/2010 | Horiuchi | F24F 11/52 |
| | | | 715/810 |
| 2010/0198425 A1* | 8/2010 | Donovan | G05D 23/1904 |
| | | | 700/299 |
| 2011/0047491 A1* | 2/2011 | Hwang | G06F 3/0488 |
| | | | 715/810 |
| 2011/0195754 A1* | 8/2011 | Aoshima | G06F 1/1616 |
| | | | 455/566 |
| 2012/0130546 A1* | 5/2012 | Matas | B01D 46/0086 |
| | | | 700/276 |
| 2012/0130547 A1* | 5/2012 | Fadell | G05D 23/1917 |
| | | | 700/276 |
| 2012/0229521 A1* | 9/2012 | Hales, IV | F24D 19/10 |
| | | | 345/684 |
| 2012/0319828 A1* | 12/2012 | Krauss | B60Q 3/16 |
| | | | 340/425.5 |
| 2013/0024799 A1* | 1/2013 | Fadell | F24F 11/64 |
| | | | 715/771 |
| 2013/0103207 A1* | 4/2013 | Ruff | H04L 67/10 |
| | | | 700/278 |
| 2013/0104079 A1* | 4/2013 | Yasui | G06F 3/0482 |
| | | | 715/834 |
| 2013/0127911 A1* | 5/2013 | Brown | G06F 3/04886 |
| | | | 345/173 |
| 2013/0159902 A1* | 6/2013 | Kwak | G06F 3/0488 |
| | | | 715/765 |
| 2014/0058567 A1* | 2/2014 | Matsuoka | G05B 15/02 |
| | | | 700/276 |
| 2014/0137020 A1* | 5/2014 | Sharma | G06F 3/0486 |
| | | | 715/810 |
| 2014/0222220 A1* | 8/2014 | Fadell | G06F 3/04847 |
| | | | 700/278 |
| 2014/0316581 A1* | 10/2014 | Fadell | F24F 11/30 |
| | | | 700/276 |
| 2014/0319232 A1* | 10/2014 | Gourlay | F24F 11/523 |
| | | | 236/1 C |
| 2015/0094861 A1* | 4/2015 | Choi | B60H 1/00985 |
| | | | 700/276 |
| 2015/0159895 A1* | 6/2015 | Quam | F24F 11/30 |
| | | | 700/275 |
| 2015/0163945 A1* | 6/2015 | Barton | G08B 5/36 |
| | | | 361/809 |
| 2015/0167995 A1* | 6/2015 | Fadell | F24F 11/59 |
| | | | 700/275 |
| 2015/0228419 A1* | 8/2015 | Fadell | G01J 5/025 |
| | | | 307/112 |
| 2016/0018127 A1* | 1/2016 | Gourlay | F24F 11/523 |
| | | | 700/278 |
| 2016/0084517 A1* | 3/2016 | Sugiyama | G06F 3/0486 |
| | | | 236/1 C |
| 2016/0349823 A1* | 12/2016 | Killo | F24F 11/61 |
| 2016/0378322 A1* | 12/2016 | Klicpera | G06F 3/04886 |
| | | | 715/773 |
| 2017/0075568 A1 | 3/2017 | Bentz et al. | |
| 2017/0082313 A1* | 3/2017 | Benichou | F24F 11/523 |
| 2017/0102838 A1* | 4/2017 | Roy | G06F 3/0482 |
| 2017/0109026 A1* | 4/2017 | Ismailov | G06F 3/04883 |
| 2017/0262153 A1* | 9/2017 | Hoglund | F24F 11/63 |
| 2017/0351394 A1* | 12/2017 | Sumida | G06F 3/0485 |
| 2018/0192130 A1* | 7/2018 | Liston | H04N 21/8405 |
| 2018/0293252 A1* | 10/2018 | Chan | G06F 16/185 |
| 2019/0145648 A1* | 5/2019 | Sinha | G08B 21/10 |
| | | | 219/482 |
| 2020/0159394 A1* | 5/2020 | Chassen | G06F 3/04845 |
| 2020/0382332 A1 | 12/2020 | Carrigan et al. | |
| 2021/0172635 A1* | 6/2021 | Schultz | F24F 11/64 |
| 2021/0172637 A1* | 6/2021 | Jones | G06F 3/0488 |
| 2021/0250551 A1* | 8/2021 | Turner | H04N 7/183 |
| 2022/0026944 A1* | 1/2022 | Harris | G05G 9/04796 |

* cited by examiner

DIGITAL HVAC CONTROLLER FOR NAVIGATING INFORMATION BASED ON TWO OR MORE INPUTS

This application claims the benefit of:

U.S. Provisional Patent Application No. 62/943,729, filed Dec. 4, 2019; the entire content of each being incorporated herein by reference.

TECHNICAL FIELD

The disclosure relates to heating, ventilation, and air condition (HVAC) systems and thermostats for buildings.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, a thermostat can control different devices depending on the outside temperature, temperature inside the building, the time of day, and other factors. To simplify the explanation, an environmental control system will be referred to as an HVAC system, unless otherwise noted.

SUMMARY

In general, this disclosure describes a heating, ventilation, and air conditioning (HVAC) controller including a display which can show any one or combination of a set point temperature for an area, a current temperature of the area, and one or more other parameters. The HVAC controller may include a user interface including a digital display configured to show one or more screens of a first set of screens. The first set of screens may represent a sequence of "carousel" screens, such that when the HVAC controller transitions from displaying a first screen to a second screen on the digital display, the HVAC controller transitions from the first screen to a screen which is adjacent to the first screen in the first set of screens.

In some examples, the HVAC controller may change the screen shown on the digital display in response to one or more user inputs to the digital user interface. These one or more user inputs may represent "swipes" on the digital user interface. In some examples, the HVAC controller may change the screen shown on the digital display in response to a rotation of a dial on the HVAC controller. In this way, the HVAC controller may change the screens based on two or more types of inputs, which is beneficial to improve a user experience with the HVAC controller as compared with HVAC controllers which do not update displayed data based on two or more types of inputs.

Each screen of the first set of screens may be associated with one or more screens of a second set of screens. The second set of screens may represent "details" screens which include at least some information not displayed on carousel screens. For example, each details screen that is associated with a carousel screen may include additional information corresponding to the respective carousel screen which is not included in the carousel screen itself. In this way, the screens displayed by the HVAC controller may represent a hierarchy of screens, such that it is possible to scroll laterally through the first set of screens and also move vertically between the first set of screens and corresponding screens of the second set of screens. It may be beneficial for the HVAC controller to change the screen displayed by the digital display both vertically and laterally so that information displayed by the HVAC controller is more easily navigable as compared with HVAC controllers which do not allow a change in display both laterally and vertically.

In some examples, a device for controlling one or more HVAC components within a building includes a rotatable dial, a digital user interface, and processing circuitry. The processing circuitry is configured to, in response to receiving a first rotation input via the rotatable dial while the digital user interface displays a first screen, cause a setpoint of the device to change in order to regulate a temperature within the building. In response to receiving a first touch input at the digital user interface while the digital user interface displays the first screen, the processing circuitry is configured to cause a menu of options being displayed on the digital user interface to change. In response to receiving a second rotation input via the rotatable dial while the digital user interface displays a second screen, the processing circuitry is configured to cause a selection being displayed on the digital user interface to change, and in response to receiving a second touch input via the digital user interface while the digital user interface displays the second screen, the processing circuitry is configured to cause the selection being displayed on the digital user interface to change.

In some examples, a method for controlling one or more HVAC components within a building includes, in response to receiving a first rotation input via a rotatable dial while a digital user interface displays a first screen, causing, by processing circuitry, a setpoint of the device to change. The method further includes, in response to receiving a first touch input at the digital user interface while the digital user interface displays the first screen, causing, by the processing circuitry, a menu of options to be displayed on the digital user interface to change. Additionally, the method includes, in response to receiving a second rotation input via the rotatable dial while the digital user interface displays a second screen, causing, by the processing circuitry, a selection being displayed on digital user interface to change and in response to receiving a second touch input via the digital user interface while the digital user interface displays the second screen, causing, by the processing circuitry, the selection being displayed on the digital user interface to change.

In some examples, a non-transitory computer-readable medium includes instructions for causing one or more processors of a device for controlling one or more HVAC components within a building to, in response to receiving a first rotation input via a rotatable dial while a digital user interface displays a first screen, cause a setpoint of the device to change, and in response to receiving a first touch input at the digital user interface while the digital user interface displays the first screen, cause a menu of options to be displayed on the digital user interface to change. Additionally, the instructions cause the one or more processors to, in response to receiving a second rotation input via the rotatable dial while the digital user interface displays a second screen, cause a selection being displayed on the digital user interface to change, and in response to receiving a second touch input via the digital user interface while the digital user interface displays the second screen, cause the selection being displayed on the digital user interface to change.

In some examples, a device for controlling one or more HVAC components within a building and controlling a digital user interface includes a dial, the digital user interface, and processing circuitry. The processing circuitry is configured to scroll, in response to detecting a set of user inputs to one or both of the digital user interface and the dial, through a sequence of carousel screens for display on the digital user interface and display, on the digital user interface after a period of time following a most recent user input of the set of user inputs, a default carousel screen of the sequence of carousel screens. Additionally, the processing circuitry is configured to display, on the digital user interface after a period of time following the display of the default carousel screen, an idle screen corresponding to the default carousel screen of the sequence of carousel screens.

In some examples, a method for controlling a digital user interface of a device configured to control one or more HVAC components within a building includes scrolling, by processing circuitry in response to detecting a set of user inputs to one or both of the digital user interface and a dial, through a sequence of carousel screens for display on the digital user interface and displaying, by the processing circuitry on the digital user interface after a period of time following a most recent user input of the set of user inputs, a default carousel screen of the sequence of carousel screens. Additionally, the method includes displaying, by the processing circuitry on the digital user interface after a period of time following the display of the default carousel screen, an idle screen corresponding to the default carousel screen of the sequence of carousel screens.

In some examples, a non-transitory computer-readable medium includes instructions for causing one or more processors of a device for controlling one or more HVAC components within a building and controlling a digital user interface to scroll, in response to detecting a set of user inputs to one or both of the digital user interface and a dial, through a sequence of carousel screens for display on the digital user interface and display, on the digital user interface after a period of time following a most recent user input of the set of user inputs, a default carousel screen of the sequence of carousel screens. Additionally, the instructions cause the one or more processors to display, on the digital user interface after a period of time following the display of the default carousel screen, an idle screen corresponding to the default carousel screen of the sequence of carousel screens.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
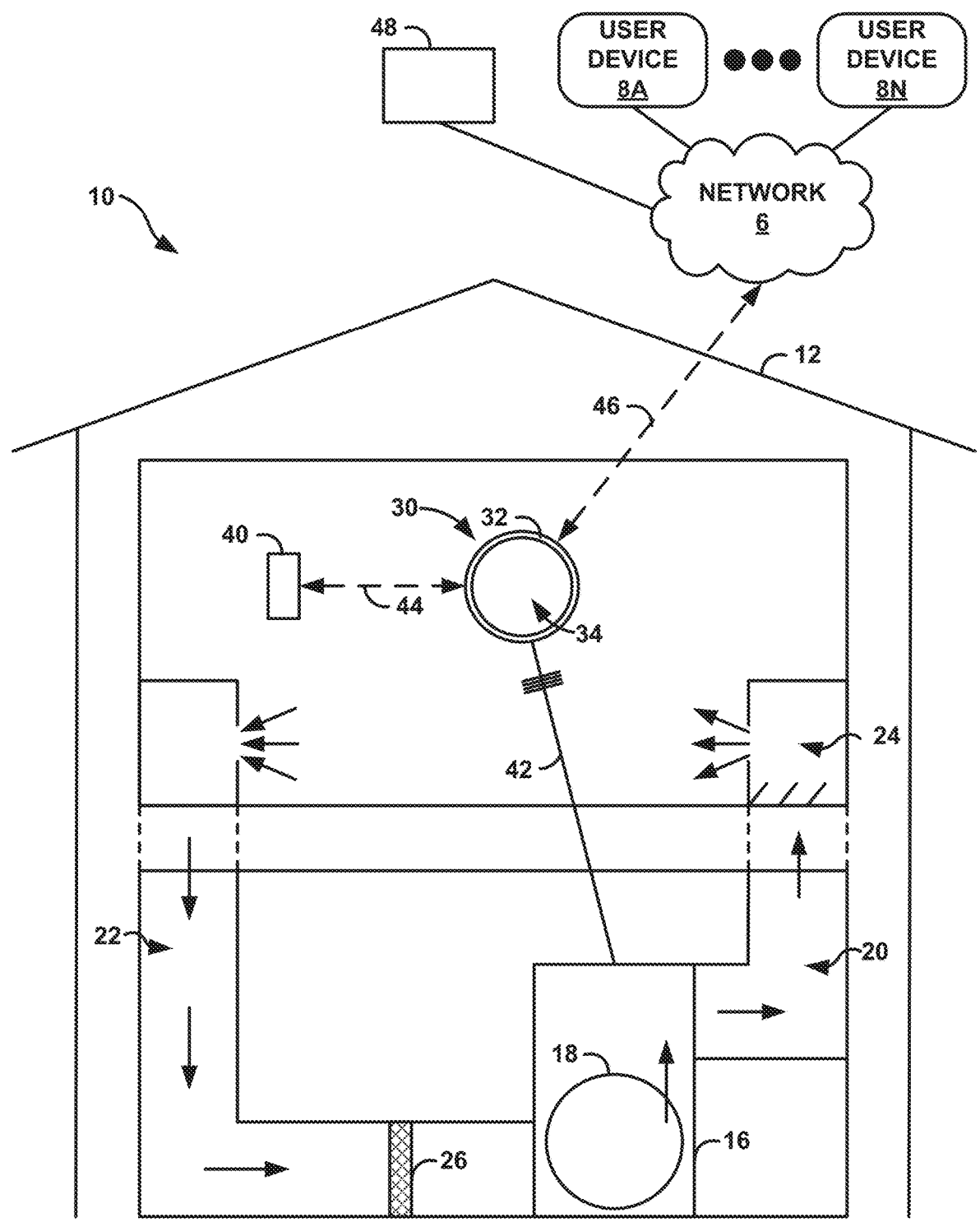
FIG. 1 is a block diagram illustrating an example heating, ventilation, and air conditioning (HVAC) system in a building, in accordance with one or more techniques described herein.

FIG. 1 is a block diagram illustrating an example heating, ventilation, and air conditioning (HVAC) system 10 in a building 12, in accordance with one or more techniques described herein. HVAC system 10 includes HVAC component(s) 16, a supply air duct 20, a return air duct 22 (collectively, "ducts 20, 22"), dampers 24, and air filters 26. Additionally, HVAC system 10 includes an HVAC controller 30 configured to control HVAC component(s) 16 to regulate one or more parameters within building 12. HVAC controller 30 may include a dial 32 and a digital user interface 34.

HVAC system 10 may include one or more devices for regulating an environment within building 12. For example, HVAC controller 30 may be configured to control the comfort level (e.g., temperature and/or humidity) in building 12 by activating and deactivating HVAC component(s) 16 in a controlled manner. HVAC controller 30 may be configured to control HVAC component(s) 16 via a wired or wireless communication link 42. In some examples, a wired communication link 42 may connect HVAC component(s) 16 and HVAC controller 30. HVAC controller 30 may be a thermostat, such as, for example, a wall mountable thermostat. In some examples, HVAC controller 30 may be programmable to allow for user-defined temperature set points to control the temperature of building 12. Based on sensed temperature of building 12, HVAC controller 30 may turn on HVAC component(s) 16 or turn off HVAC component(s) 16 in order to reach the user-defined temperature set point. Although this disclosure describes HVAC controller 30 (and controllers shown in other figures) as controlling HVAC component(s) 16, external computing device 40 may also be configured to perform these functions. The techniques of this disclosure will primarily be described using examples related to temperature, but the systems, devices, and methods described herein may also be used in conjunction with other sensed properties, such as humidity or air quality. In some examples, HVAC controller 30 may be configured to control all of the critical networks of a building, including a security system.

HVAC component(s) 16 may provide heated air (and/or cooled air) via the ductwork throughout the building 12. As illustrated, HVAC component(s) 16 may be in fluid communication with one or more spaces, rooms, and/or zones in building 12 via ducts 20, 22, but this is not required. In operation, when HVAC controller 30 outputs a heat call signal to HVAC component(s) 16, HVAC component(s) 16 (e.g., a forced warm air furnace) may turn on (begin operating or activate) to supply heated air to one or more spaces within building 12 via supply air ducts 20. HVAC component(s) 16, which include an air movement device 18 (e.g., a blower or a fan), can force the heated air through supply air duct 20. In this example, cooler air from each space returns to HVAC component(s) 16 (e.g. forced warm air furnace) for heating via return air ducts 22. Similarly, when a cool call signal is provided by HVAC controller 30, a cooling device (e.g., an air conditioning (AC) unit) of HVAC component(s) 16 may turn on to supply cooled air to one or more spaces within building 12 via supply air ducts 20. Air movement device 18 may force the cooled air through supply air duct 20. In this example, warmer air from each space of building 12 may return to HVAC component(s) 16 for cooling via return air ducts 22.

In some examples, HVAC component(s) 16 may include any one or combination of a fan, a blower, a furnace, a heat pump, an electric heat pump, a geothermal heat pump, an electric heating unit, an AC unit, a humidifier, a dehumidifier, an air exchanger, an air cleaner, a damper, a valve, and a fan, however this is not required. HVAC component(s) 16 may include any device or group of devices which contributes to regulating the environment within building 12 based on signals received from HVAC controller 30 or contributes to regulating the environment within building 12 independently from HVAC controller 30.

Ducts 20, 22 may include one or more dampers 24 to regulate the flow of air, but this is not required. For example, one or more dampers 24 may be coupled to HVAC controller 30 and can be coordinated with the operation of HVAC component(s) 16. HVAC controller 30 may actuate dampers 24 to an open position, a closed position, and/or a partially open position to modulate the flow of air from the one or more HVAC components to an appropriate room and/or space in building 12. Dampers 24 may be particularly useful in zoned HVAC systems, and may be used to control which space(s) in building 12 receive conditioned air and/or receives how much conditioned air from HVAC component(s) 16.

In many instances, air filters 26 may be used to remove dust and other pollutants from the air inside building 12. In the example shown in FIG. 1, air filters 26 is installed in return air duct 22 and may filter the air prior to the air entering HVAC component(s) 16, but it is contemplated that any other suitable location for air filters 26 may be used. The presence of air filters 26 may not only improve the indoor air quality but may also protect the HVAC component(s) 16 from dust and other particulate matter that would otherwise be permitted to enter HVAC component(s) 16.

HVAC controller 30 may include any suitable arrangement of hardware, software, firmware, or any combination thereof. For example, HVAC controller 30 may include processing circuitry comprising microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, the processing circuitry may include any suitable structure, whether in hardware, software, firmware, or any combination thereof, to perform the functions ascribed herein to HVAC controller 30.

Although not shown in FIG. 1, HVAC controller 30 may include a memory configured to store information within HVAC controller 30 during operation. The memory may include a computer-readable storage medium or computer-readable storage device. In some examples, the memory includes one or more of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by the processing circuitry of HVAC controller 30. In some examples, the memory of HVAC controller 30 may be able to store data to and read data from memory included in external computing device 40 and/or memory included in external database 48. The memory may be used for storing network settings such as an Internet Protocol (IP) address and/or a Media Access Control (MAC) address of HVAC controller 30, external computing device 40, and/or a router.

In some examples, HVAC controller 30 may include a set of wire terminals which make up a terminal block (e.g., a wall plate or a terminal plate) for receiving a set of control wires for one or more HVAC component(s) 16 of HVAC system 10. The memory of HVAC controller 30 may store one or more wiring configurations for HVAC component(s) 16, allowing HVAC controller 30 to determine which of HVAC component(s) 16 are connected to HVAC controller 30. The memory of HVAC controller 30 may also store settings for HVAC system 10 which correspond to the one or more wiring configurations for HVAC component(s) 16. For example, if HVAC controller 30 is wired to an AC unit of HVAC component(s) 16, HVAC controller 30 may determine one or more settings for controlling the AC unit to turn on and turn off.

In some examples, the memory of HVAC controller 30 may store program instructions, which may include one or more program modules, which are executable by HVAC controller 30. When executed by HVAC controller 30, such program instructions may cause HVAC controller 30 to provide the functionality ascribed to it herein. The program instructions may be embodied in software, firmware, and/or RAMware.

In some examples, HVAC controller 30 may include a dial 32 which is located at an outer circumference of HVAC controller 30. HVAC controller 30 may be fixed to a wall or another surface such that dial 32 may be rotated relative to one or more other components (e.g., digital user interface 34) of HVAC controller 30. Dial 32 may represent a user interface such that processing circuitry of HVAC controller 30 may receive, dial 32 and/or dial circuitry electrically connected to dial 32, information indicative of a user input. In some examples, the user input may represent a user selection of a set point parameter value (e.g., a set point temperature), a user selection of information to be displayed by HVAC controller 30, or a user selection of another setting. In some examples, dial 32 may smoothly rotate with respect to digital user interface 34. In some examples, dial 32 may rotate with one or more steps such that as dial 32 rotates, dial 32 "snaps" into position after every interval of rotational distance. In some examples, dial 32 may smoothly rotate with respect to digital user interface 34 and HVAC controller 30 may output an audio signal (e.g., a clicking noise) for every interval of rotational position (e.g., every one degree) in which dial 32 rotates.

In some examples, dial 32 does not move inwards in response to a force applied to dial 32. For example, dial 32 may rotate about a center axis which passes through a center of dial 32 without moving along the center axis in response to one or more forces applied to dial 32. When HVAC controller 30 is mounted on a vertical surface such as a wall, HVAC controller 30 may prevent dial 32 from depressing inwards towards the vertical surface while allowing the dial 32 to rotate.

In some examples, dial 32 may include a set of light-emitting diodes (LEDs) configured to illuminate a portion or a whole of dial 32, but this is not required. The processing circuitry of HVAC controller 30 may selectively illuminate one or more LEDs of the set of LEDs in order to indicate a set point temperature or convey other information. In some examples, the set of LEDs included in dial 32 may illuminate dial 32 to indicate that HVAC system 10 is in a heating mode or indicate that HVAC system 10 is in a cooling mode. For example, when HVAC system 10 is in a heating mode (e.g., HVAC controller 30 is outputting one or more instructions for HVAC component(s) 16 to increase a temperature within building 12), the LEDs of dial 32 cause dial 32 to illuminate at a first color. When HVAC system 10 is in a cooling mode (e.g., HVAC controller 30 is outputting one or more instructions for HVAC component(s) 16 to decrease a temperature within building 12), the LEDs of dial 32 cause dial 32 to illuminate at a second color. In this way, the LEDs of dial 32 may indicate whether HVAC system 10 is operating in the heating mode or the cooling mode.

Digital user interface 34 may include information relating to one or more aspects of an area in which HVAC controller 30 is located (e.g., a room in which HVAC controller 30 is located, a building in which HVAC controller 30 is located, an area outside of a building in which HVAC controller 30 is located, or any combination thereof). Digital user interface 34 may be round in shape and digital user interface 34 may be located an area within a circumference of dial 32 such that edges of dial 32 are visible around an outer circumference of digital user interface 34. At least part of dial 32 and digital user interface 34 may represent an outer surface of HVAC controller 30, allowing dial 32 and digital user interface 34 to receive user input.

In some examples, at least a portion of digital user interface 34 includes a digital display. The digital display may represent a user interface which permits a user to input various operating parameters (e.g., temperature set points, humidity set points, fan set points, starting times, ending times, schedule times, diagnostic limits, configuration settings, responses to alerts, and instructions to change a screen) to HVAC controller 30. In some examples, digital user interface 34 may represent a physical user interface that is accessible at HVAC controller 30 and may include a touch screen (e.g., a full color touch screen display) and/or a distinct keypad. The digital display of digital user interface 34 may include any suitable display. In some examples, digital user interface 34 may include any one or combination of a liquid crystal display (LCD), an e-ink display, fixed segment display, or a dot matrix LCD display. In one or more examples where digital user interface 34 includes a distinct keypad, the distinct keypad may include a numerical keypad, a system of buttons, a control knob, or any combination thereof. HVAC controller 30 may, in some cases, display information and/or accept user inputs via the user interface of external computing device 40.

A user may interact with HVAC controller 30 through a mobile phone, a tablet, a computer, or another device. For example, user devices 8A-8N (collectively, "user devices 8") may communicate with HVAC controller 30 via network 6. HVAC controller 30 may, in some examples, be configured to communicate directly with network 6 without communicating with network 6 via a gateway device (e.g., a Wi-Fi router) within building 12. In some examples, HVAC controller 30 may receive instructions from one or more of user devices 8. The instructions may include, for example, a request to change a set point temperature for an area within building 12. HVAC controller 30 may change the set point temperature in response to receiving the instruction. In turn, HVAC controller 30 may control HVAC component(s) 16 to control the temperature within building 12 to reach the new set point.

In some examples, digital user interface 34 may include a presence sensitive device to detect user inputs to HVAC controller 30. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Digital user interface 34 of HVAC controller 30 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to a user. The user interface presented by the display of HVAC controller 30 may allow a user to program settings of HVAC controller 30, set temperature zones for building 12, configure desired temperatures for building 12 for different times of the day or days of the week, or other operating parameters. Digital user interface 34 of HVAC controller 30 may also be used to present user queries (e.g., what room HVAC controller 30 is installed in, what the address of building 12 is, what HVAC component(s) 16 are connected to HVAC controller 30, etc.). Such queries may aid in installing and/or configuring HVAC controller 30 (e.g. when first connecting HVAC controller 30 to HVAC component(s) 16 of HVAC system 10).

In some examples, digital user interface 34 may be configured to display any one of a plurality of screens, wherein each screen of the plurality of screens is related to a specific one or more parameters or one or more topics corresponding to the building in which HVAC controller is placed. For example, the plurality of screens may include one or more time and outdoor temperature screens, one or more inside temperature screens, one or more air quality screens, one or more water usage screens, one or more energy usage screens, and one or more security screens, however this is not required. Additionally, or alternatively, the plurality of screens may include other types of screens. In some examples, the processing circuitry of HVAC controller 30 may receive a signal or a sequence of signals indicative of a user selection of a screen of the plurality of screens for display by HVAC controller 30. For example, HVAC controller 30 may allow the set of screens to be scrolled across digital user interface 34.

In some examples, the plurality of screens may include a first set of screens which represent a set of carousel screens. As described herein, the "set of carousel screens" refer to a set of screens which are arranged in a sequence of carousel screens, each carousel screen of the sequence of carousel screens being associated with a respective theme of a set of themes. The set of themes may include an indoor temperature theme, an outdoor temperature theme, an air quality theme, a water consumption theme, an energy consumption theme, and a security theme, or any combination thereof. Additionally, or alternatively, the set of themes may include one or more other themes.

When digital user interface 34 shows a carousel screen corresponding to the air quality theme, for example, digital user interface 34 may display information relating to an air quality within building 12 or outside of building 12. For example, digital user interface 34 may display an air quality value within building 12, wherein the air quality value is measured by an air quality sensor which is configured to communicate with HVAC controller 30 or located within HVAC controller 30. While digital user interface 34 displays the carousel screen corresponding to the air quality theme, however, digital user interface 34 might not display information corresponding to other themes, such as temperature or security, as examples.

At a point in time, HVAC controller 30 may display a carousel screen of the set of carousel screens on digital user interface 34. HVAC controller 30 may be configured to transition the carousel screen displayed on the digital user interface 34 by cycling through the sequence of carousel screens. Since the sequence of carousel screens is arranged in an order, HVAC controller 30 may be configured to cycle forwards and/or backwards through the sequence of carousel screens.

In some examples, the plurality of screens compatible for display by user interface 34 may also include a second set of screens representing a set of details screens, and a third set of screens representing a set of idle screens. As described herein, the "set of details screens" may include at least some information which is not included by the set of carousel screens. For example, each details screen that is associated with a carousel screen may include additional information corresponding to the respective carousel screen which is not included in the carousel screen itself. In this way, a details screen corresponding to a carousel screen may be associated with the same theme as the respective carousel screen.

In some examples, the plurality of screens compatible for display by user interface 34 may also include a third set of screens representing a set of idle screens. As described herein, the "set of idle screens" may represent one or more screens displayed by user interface 34 while HVAC controller 30 is operating in an idle state. Each idle screen of the set of idle screens may correspond to a respective carousel screen of the set of carousel screens. In some examples, each idle screen of the set of idles screens may be associated with a same theme of a corresponding carousel screen of the set of carousel screens.

In some examples, when a period of time elapses since a most recent user input is received by HVAC controller 30, HVAC controller 30 may enter an idle state. When HVAC controller 30 is in the idle state, the processing circuitry of HVAC controller 30 may output an idle screen for display by digital user interface 34. In some examples, the idle screen may include a set point temperature for an area within building 12 and/or a current temperature of the area within building 12, but this is not required. In some examples, HVAC controller 30 may select the idle screen based on user input received by HVAC controller 30. In some examples, HVAC controller 30 may select the idle screen based on information received from network 6. In any case, when the period of time elapses since HVAC controller 30 receives the most recent user input, HVAC controller 30 may enter the idle state and display the idle screen on digital user interface 34.

In some examples, responsive to detecting a rotation of dial 32 while HVAC controller 30 is in the idle state, HVAC controller 30 transitions out of the idle state to a temperature set point mode. HVAC controller 30 may change a temperature set point for an area within building 12 in response to detecting the rotation of dial 32. In other words, HVAC controller 30 may determine that a rotation of dial 32 while HVAC controller 30 is in the idle state represents a user request to change a temperature set point. In transitioning out of the idle state, the processing circuitry of HVAC controller 30 may display the temperature set point for the area within building 12 on digital user interface 34. Additionally, HVAC controller 30 may display the temperature set point changing as dial 32 rotates. For example, the digital user interface 34 may show the temperature setpoint cycle through a range of degrees, where each change from one degree to another degree is reflected on digital user interface 34. In some examples, HVAC controller 30 may emit a noise each time the temperature set point changes from one degree value to another degree value. The noise may represent a clicking noise a, a tapping noise, or another type of noise.

HVAC controller 30 may be configured to perform one or more other actions in response to a rotation of dial 32 in addition to changing the temperature set point or alternatively to changing the temperature set point. For example, digital user interface 34 may receive a touch input which causes HVAC controller 30 to transition from a temperature set point mode to a display screen mode. When HVAC controller 30 transitions to the display screen mode, HVAC controller 30 may change a screen displayed on digital user interface 34 in response to detecting a rotation of dial 32. For example, digital user interface 34 may display one or more of the set of carousel screens. As discussed above, the set of carousel screens represent a sequence of carousel screens, such that a change from one carousel screen to another carousel screen represents a change to an adjacent carousel screen of the sequence of carousel screens. In some examples, when dial 32 stops rotating, HVAC controller 30 may continue to display a carousel screen of the set of carousel screens displayed by digital user interface 34 at the time in which dial 32 stops rotating.

Additionally, or alternatively, HVAC controller 30 may be configured to change the carousel screen displayed by digital user interface 34 in response to one or more touch inputs to digital user interface 34 when HVAC controller is in the display screen mode. For example, the processing circuitry of HVAC controller 30 may detect a "swipe" input to digital user interface 34. In response to detecting the swipe input, HVAC controller 30 may transition digital user interface 34 from displaying a first carousel screen to a second carousel screen, where the first carousel screen and the second carousel screen are adjacent in the sequence of carousel screens. In this way, HVAC controller 30 may be configured to change the screen displayed on digital user interface 34 based on one or both of a rotation of dial 32 and a touch input to digital user interface 34.

It may be beneficial for HVAC controller 30 to have the ability to change the carousel screen based on one or both of the rotation of dial 32 and a touch input to digital user interface 34, so that a user interaction with HVAC controller 30 is improved as compared with HVAC controllers that do not allow display change based on more than one type of user input. In other words, by transitioning HVAC controller 30 from a set point mode where a temperature set point is changed responsive to a rotation of dial 32 to a display screen mode where the screen displayed by digital user interface 34 is changed responsive to a rotation of dial 32 and/or a touch input to digital user interface 34, HVAC controller 30 may provide a user with an efficient user experience.

HVAC controller 30 may include a communication device (not illustrated in FIG. 1) to allow HVAC controller 30 to communicate via a wired or wireless connection 44 to external computing device 40. The communication device may include a Bluetooth transmitter and receiver, a Wi-Fi transmitter and receiver, a Zigbee transceiver, a near-field communication transceiver, or other circuitry configured to allow HVAC controller 30 to communicate with external computing device 40. In some examples, the communication device may allow HVAC controller 30 to exchange data with external computing device 40. Examples of exchanged data include a desired temperature for building 12, HVAC component(s) 16 connected to HVAC controller 30, error codes, geographic location, estimated energy usage and cost, and/or other operating parameters or system performance characteristics for HVAC system 10.

HVAC controller 30 may communicate via wired or wireless connection 44 with external computing device 40. External computing device 40 may be, include, or otherwise be used in combination with a mobile phone, smartphone, tablet computer, personal computer, desktop computer, personal digital assistant, router, modem, remote server or cloud computing device, and/or related device allowing HVAC controller 30 to communicate over a communication network such as, for example, the Internet or other wired or wireless connection. Communicating via the wired or wireless connection 44 may allow HVAC controller 30 to be configured, controlled, or otherwise exchange data with external computing device 40. In some examples, HVAC controller 30 communicating via wired or wireless connection 44 may allow a user to set up HVAC controller 30 when first installing the controller in building 12. In some examples, HVAC controller 30 and external computing device 40 communicate through a wireless network device such as a router or a switch. In other examples, HVAC controller 30 and external computing device 40 communicate through a wired connection such as an ethernet port, USB connection, or other wired communication network.

HVAC controller 30 may, via the communication device, communicate via a wired or wireless connection 46 with external database 48. In some examples, wired or wireless connection 46 enables HVAC controller 30 to communicate with external database 48 via a wireless connection which includes a network device such as a router, ethernet port, or switch. HVAC controller 30 and external database 48 may also communicate through a wired connection such as an ethernet port, USB connection, or other wired communication network. Communicating via the wired or wireless connection 46 may allow HVAC controller 30 to exchange data with external database 48. As such, external database 48 may be at a location outside of building 12. In some examples, external database 48 may be, include, or otherwise be used in combination with a remote server, cloud computing device, or network of controllers configured to communicate with each other. For example, HVAC controller 30 may receive data from HVAC controllers in nearby buildings through the internet or other city- or wide-area network. HVAC controller 30 may include the onboard database because it is unable to communicate via the communication device.

In some examples, external database 48 may be, or otherwise be included in, or accessed via, external computing device 40 (e.g., smartphone, mobile phone, tablet computer, personal computer, etc.). For example, HVAC controller 30 may communicate via a Wi-Fi network connection with a smartphone device to exchange data with external database 48. By communicating via wired or wireless connection 46, HVAC controller 30 may exchange data with external database 48.

In some examples, HVAC controller 30 may display a setpoint as a bright white light at moving around a perimeter of HVAC controller 30. As dial 32 rotates, the light may move with dial 32 to show a selected setpoint. If the setpoint is changed via a mobile application on one or more of user devices 8, the light may move on HVAC controller 30 to show the selected setpoint. An application of one of user devices 8 may enable a user to view one or more aspects of HVAC controller 30.

In some examples, if a Buoy water valve is installed, HVAC controller 30 may receive details on water usage and leak status. In some examples, if a security system is installed, HVAC controller 30 may control the security system.

Figure 2:
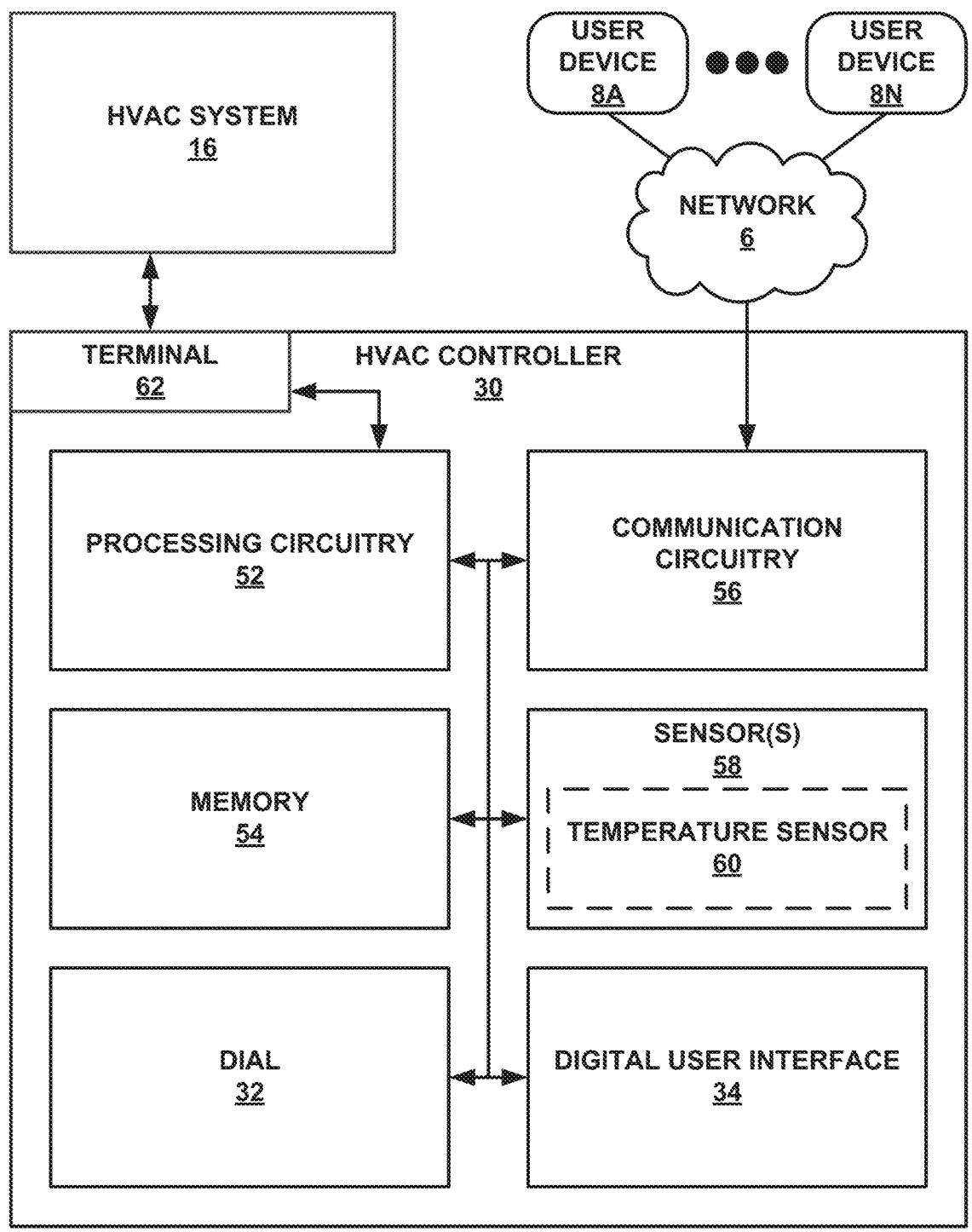
FIG. 2 is a block diagram illustrating an example HVAC controller including a digital display, in accordance with one or more techniques described herein.

FIG. 2 is a block diagram illustrating an example configuration of the HVAC controller 30 of FIG. 1, in accordance with one or more techniques described herein. As seen in FIG. 2, HVAC controller 30 includes dial 32, digital user interface 34, processing circuitry 52, memory 54, communication circuitry 56, sensor(s) 58, and terminal 62. Sensor(s) 58 may, in some examples, include a temperature sensor 60. HVAC controller 30 may be configured to communicate with HVAC component(s) 16 via terminal 62 and/or communicate with user devices 8 via network 6.

HVAC controller 30 may be configured to control HVAC component(s) 16 in order to regulate one or more parameters of a space (e.g., a building, one or more rooms within a building, a large vehicle, or a vessel). In some examples, HVAC controller 30 regulates a temperature within the space. HVAC controller 30 may regulate the temperature of the space by using HVAC component(s) 16 to decrease a temperature of the space if the current temperature of the space is greater than a first set point temperature and/or increase a temperature of the space using HVAC component(s) 16 if the current temperature of the space is less than a second set point temperature. In some examples, the first set point temperature (e.g., a cooling set point temperature) is less than the second set point temperature (e.g., a heating set point temperature). In some examples, the first set point temperature is equal to the second set point temperature.

Processing circuitry 52 may include microprocessors, DSPs, ASICs, FPGAs, or equivalent discrete or integrated logic circuitry, or a combination of any of the foregoing devices or circuitry. Accordingly, processing circuitry 52 may include any suitable structure, whether in hardware, software, firmware, or any combination thereof, to perform the functions ascribed herein to HVAC controller 30.

In some examples, memory 54 includes a computer-readable storage medium or computer-readable storage device. In some examples, memory 54 includes one or more of a short-term memory or a long-term memory. Memory 54 may include, for example, RAM, DRAM, SRAM, magnetic discs, optical discs, flash memories, or forms of EPROM or EEPROM. In some examples, memory 54 is used to store program instructions for execution by the processing circuitry of HVAC controller 30. In some examples, the memory of HVAC controller 30 may be able to store data to and read data from memory included in external computing device 40 and/or memory included in external database 48. The memory may be used for storing network settings such as an Internet Protocol (IP) address and/or a Media Access Control (MAC) address of HVAC controller 30, external computing device 40, and/or a router.

Communication circuitry 56 may include any suitable hardware, firmware, software or any combination thereof for communicating with another device, such as user devices 8 or other devices. Under the control of processing circuitry 52, communication circuitry 56 may receive downlink telemetry from, as well as send uplink telemetry to, one of user devices 8 or another device with the aid of an internal or external antenna. Communication circuitry 56 may include a Bluetooth transmitter and receiver, a Wi-Fi transmitter and receiver, a Zigbee transceiver, a near-field communication transceiver, or other circuitry configured to allow HVAC controller 30 to communicate with one or more remote devices such as user devices 8. In some examples, communication circuitry 56 may allow HVAC controller 30 to exchange data with external computing device 40 of FIG. 1. Examples of exchanged data include a desired temperature for the space, one or more control parameters for HVAC component(s) 16, error codes, geographic location, estimated energy usage and cost, and/or other operating parameters or system performance characteristics for HVAC component(s) 16.

In some examples, HVAC controller 30 includes one or more sensor(s) 58 including temperature sensor 60. In some examples, temperature sensor 60 is located within a housing of HVAC controller 30. In some examples, temperature sensor 60 is located remotely from HVAC controller 30 and may communicate with HVAC controller 30 via communication circuitry 56 or terminal 62. For example, temperature sensor 60 may be located in the same room or the same area as HVAC controller 30 while being separate from HVAC controller 30 such that heat generated from components of HVAC controller 30 does not affect a temperature signal generated by temperature sensor 60. It may be beneficial for temperature sensor 60 to be located separately from HVAC controller 30 in order to obtain an accurate temperature reading. In some examples where temperature sensor 60 is located within the housing of HVAC controller 30, HVAC controller 30 may prevent components from affecting a temperature signal generated by temperature sensor 60. In some examples, at least a portion of the housing of HVAC controller 30 may include stainless steel and the housing may be coated with a material which hides fingerprints. In some examples, the term "housing" may be used herein to describe an outer surface of HVAC controller 30, including on outer surface of dial 32, an outer surface of digital user interface 34, and an outer face of HVAC controller 30 which is fixed to a wall or another surface.

In some examples, a housing of HVAC controller 30 may be substantially cylindrical in shape and dial 32 may represent a ring-shaped piece that is located at an outer circumference of HVAC controller 30. In some examples, HVAC controller 30 includes a first face configured to be mounted on a plate which is fixed to a wall or another surface, a second face including a display, and a third face representing a side of HVAC controller 30, the third face extending around a circumference of HVAC controller 30. Dial 32 may include the third face of HVAC controller 30. In some examples, dial 32 is configured to rotate with respect to one or more other components of HVAC controller 30. For example, dial 32 is configured to rotate with respect to digital user interface 34. In some examples, dial 32 is configured to rotate in response to a user input. Dial 32 may be electrically connected to dial circuitry (not illustrated in FIG. 2) which may generate an electrical signal indicative of one or more rotational parameters (e.g., a rotational position, a rotational velocity, and/or a rotational acceleration) of dial 32. The dial circuitry may output the electrical signal indicative of the one or more rotational parameters to processing circuitry 52. In some examples, the dial circuitry is part of processing circuitry 52.

Digital user interface 34 may be located on a face (e.g., the second face) of HVAC controller 30. In some examples, digital user interface 34 may, in some cases, be substantially circular in shape. In some examples, digital display may include a presence sensitive device to detect user inputs to HVAC controller 30. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Digital user interface 34 of HVAC controller 30 may function as an output device using any one or more display devices, such as an LCD, dot matrix display, LED display, OLED display, e-ink, or similar monochrome or color display capable of outputting visible information to a user.

In some examples, digital user interface 34 may display a set of carousel screens, which may represent a sequence of screens. In some examples, each screen of the set of carousel screens may be related to one or more parameters of an environment in which HVAC controller 30 is located, one or more settings of HVAC controller 30, and/or one or more other aspects associated with HVAC controller 30. For example, the set of carousel screens may include a time & outdoor temperature screen, a comfort (e.g., inside temperature) screen, an air quality screen, a water screen, an energy screen, and a security screen. In some examples, digital user interface 34 may scroll through the carousel of screens based on two or more kinds of user input, such as a rotation of dial 32 and/or swipe inputs received by digital user interface 34. In some examples, digital user interface 34 may scroll through the carousel of screens without user input.

Processing circuitry 52 may be configured to set and/or change one or more temperature set points corresponding to a space (e.g., a space within building 12). For example, a first set point temperature may represent a cooling set point temperature and a second set point temperature may represent a heating set point temperature. In some examples, if HVAC controller 30 is in a cooling mode and the current temperature is greater than the cooling set point temperature, processing circuitry 52 may control HVAC component(s) 16 to regulate the temperature in the space to reach the cooling set point temperature over a period of time based on the current temperature and the cooling set point temperature. In some examples, if HVAC controller 30 is in a heating mode and the current temperature is less than the heating set point temperature, processing circuitry 52 may control HVAC component(s) 16 to regulate the temperature in the space to reach the heating set point temperature over a period of time based on the current temperature and the heating set point temperature.

In some example, processing circuitry 52 is configured to receive an instruction to change and/or set one or more temperature set points of HVAC controller 30 from dial circuitry electrically connected to dial 32, where the instruction is indicative of a user selection of one or more temperature set points using dial 32. For example, in response to a first rotation of dial 32, processing circuitry 52 may set the cooling temperature set point value to a first temperature value if a cooling set point mode of HVAC controller 30 is activated. In response to a second rotation of dial 32, processing circuitry 52 may set the heating temperature set point value to a second temperature value if a heating set point mode of HVAC controller 30 is activated. Processing circuitry 52 may control whether HVAC controller is in the heating set point mode or the cooling set point mode based on one or more user inputs received from digital user interface 34. In some examples, processing circuitry 52 is configured to receive an instruction to change and/or set one or more temperature set points of HVAC controller 30 from one or more of user devices 8 via network 6. In any case, processing circuitry 52 may change the one or more temperature set points in response receiving instructions to change the one or more temperature set points.

Figure 3:
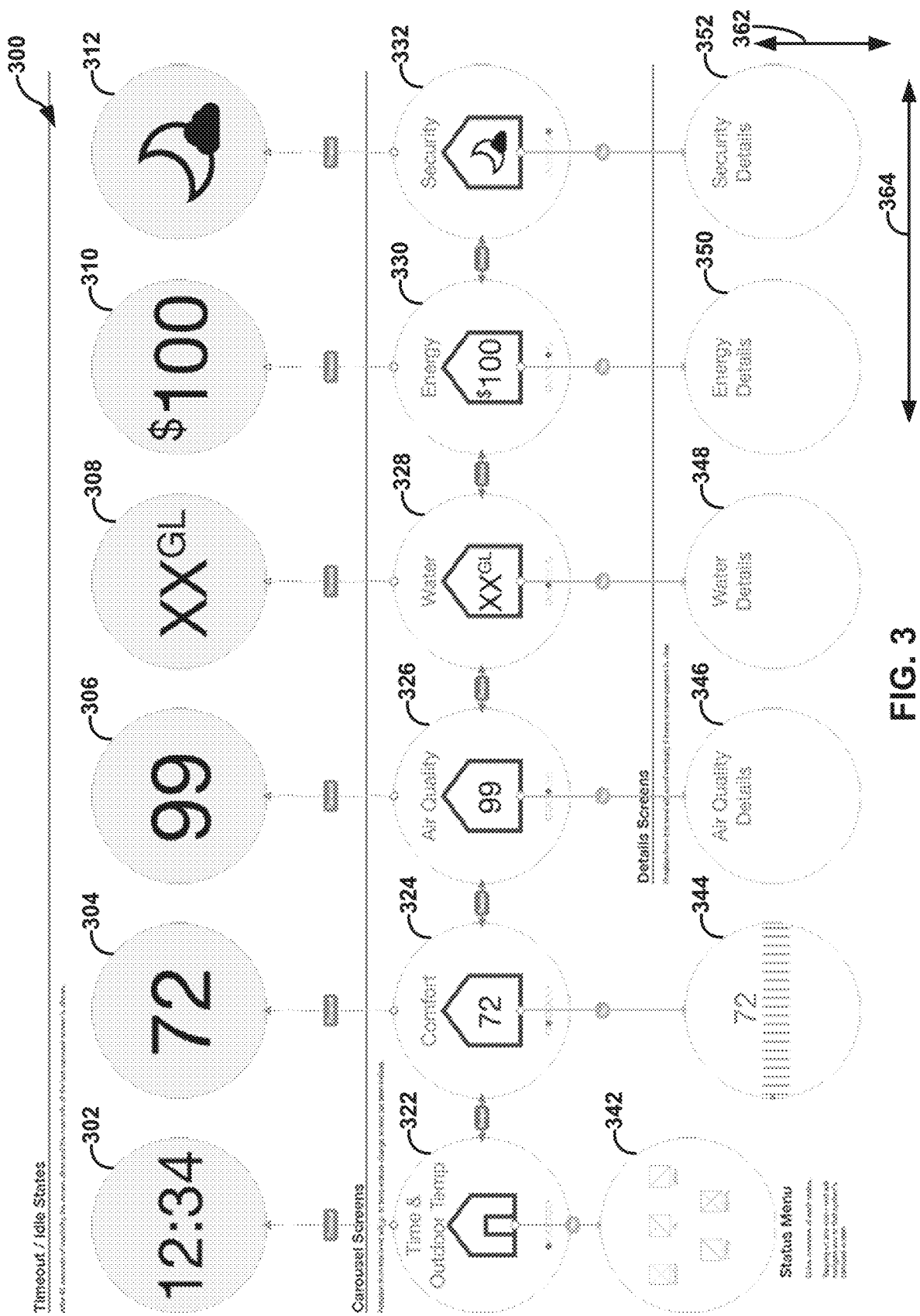
FIG. 3 is a conceptual diagram illustrating an example screen hierarchy for one or more screens which may be displayed by a digital user interface, in accordance with one or more techniques described herein.

FIG. 3 is a conceptual diagram illustrating an example screen hierarchy for one or more screens 300 which may be displayed by digital user interface 34, in accordance with one or more techniques described herein. The one or more screens 300 include idle screens 302-312, carousel screens 322-332, and details screens 342-352. FIG. 3 is described with respect to HVAC system 10 and HVAC controller 30 of FIG. 1 and FIG. 2. However, the techniques of FIG. 3 may be performed by different components of HVAC system 10 and HVAC controller 30 or by additional or alternative systems or devices.

Processing circuitry 52 is configured to control which of screens 300 is displayed by digital user interface 34 at any given point in time. In some examples, processing circuitry 52 may change the screen displayed by digital user interface 34 in response to receiving one or more user inputs. In some examples, processing circuitry 52 may automatically change the screen displayed by digital user interface 34 without receiving any user inputs. Screens 300 are organized in a hierarchy which determines a manner in which processing circuitry 52 sets, changes, and transitions the screen displayed by digital user interface 34. As seen in FIG. 3, idle screens 302-212 are located at a "top" of the hierarchy, carousel screens 322-332 are located below the idle screens 302-212 in the hierarchy, and details screens 342-352 are located below the carousel screens 322-332 in the hierarchy at the "bottom" of the hierarchy.

Screen transitions in the vertical direction 362 may be referred to herein as "vertical transitions." Screen transitions in the horizontal direction 364 may be referred to herein as "horizontal transitions." For example, a transition from displaying carousel screen 328 on digital user interface 34 to displaying idle screen 308 on digital user interface 34 may represent a vertical transition, since the transition is an upwards moment through the hierarchy along vertical direction 362. A transition from displaying carousel screen 328 on digital user interface 34 to displaying carousel screen 330 on digital user interface 34 may represent a horizontal transition, since the transition is a sideways moment through the hierarchy along horizontal direction 364. A group of screens which are arranged vertically in the hierarchy may be referred to as a "vertical grouping of screens." For example, idle screen 304, carousel screen 324, and details screen 344 represent a vertical grouping of screens since idle screen 304 is an idle screen corresponding to carousel screen 324 and details screen 344 is a details screen corresponding to carousel screen 324.

In some examples, processing circuitry 52 selects a vertical grouping of screens as a default vertical grouping of screens. The default vertical group of screens represents a vertical group of screens which HVAC controller 30 defaults to while HVAC controller 30 is in an idle state. HVAC controller 30 may enter the idle state when a period of time elapses following a most recent user input to HVAC controller 30. HVAC controller 30 may remain in the idle state until HVAC controller 30 receives a user input. In one example, processing circuitry 52 may select idle screen 304, carousel screen 324, and details screen 344 (collectively, "screens 304, 324, 344") as the default vertical group of screens. During the idle state, processing circuitry 52 may output the idle screen of the default vertical group of screens for display by digital user interface 34. As such, when screens 304, 324, 344 represent the default vertical group of screens, processing circuitry 52 displays idle screen 304 while HVAC controller 30 is in the idle state. When HVAC controller 30 receives a user input (e.g., a touch input to digital user interface 34) after a time when HVAC controller 30 is in the idle state, processing circuitry 52 may vertically transition from displaying idle screen 304 to displaying carousel screen 324 on digital user interface 34.

When processing circuitry 52 displays carousel screen 324 in response to a user touch input to digital user interface 34, HVAC controller 30 may be in a display screen mode, and processing circuitry 52 may transition the screen displayed by digital user interface 34 based on one or both of swipe inputs to digital user interface 34 and rotations of dial 32. That is, processing circuitry 52 may transition from displaying carousel screen 324 to displaying carousel screen 326 in response to detecting a rightward swipe input to digital user interface 34 or detecting a rightward rotation of dial 32 and processing circuitry 52 may transition from displaying carousel screen 324 to displaying carousel screen 322 in response to detecting a leftward swipe input to digital user interface 34 or detecting a leftward rotation of dial 32. It may be beneficial for processing circuitry 52 to change the carousel screen based on two or more types of user input, such as rotations of dial 32 and/or swipe inputs to digital user interface 34, so that a user experience with HVAC controller 30 is improved as compared with one or more HVAC controllers which do not change display screens based on two or more types of user input. Additionally, in some cases, it may be beneficial for processing circuitry 52 to change the carousel screen specifically based on rotations of dial 32 and/or swipe inputs to digital user interface 34 since rotating dial 32 and swiping on digital user interface 34 represent easy and natural ways to interact with HVAC controller 30.

In some examples, processing circuitry 52 may cycle through more than one carousel screen of carousel screens 322-332 within a short period of time (e.g., less than 10 seconds). For example, processing circuitry 52 may transition from one carousel screen to another carousel screen after detecting a rotation of dial 32 by a threshold number of degrees. In other words, if dial 32 rotates continuously, processing circuitry 52 may cycle through several carousel screens. When dial 32 stops rotating, processing circuitry 52 may maintain a current carousel screen for display by digital user interface 34. For example, in response to one rotation of dial 32, processing circuitry 52 may transition from carousel screen 324 to carousel screen 326, transition from carousel screen 326 to carousel screen 328, and transition from carousel screen 328 to carousel screen 330. Processing circuitry 52 may stop transitioning carousel screens at carousel screen 330 when dial 32 stops rotating. Subsequently, processing circuitry 52 may detect a "tap" touch input to digital user interface 34, causing processing circuitry 52 to transition carousel screen 330 to details screen 350.

In some examples, processing circuitry 52 may transition from displaying one carousel screen to an adjacent carousel screens in response to detecting one swipe input to digital user interface 34. A swipe input may represent a horizontal user touch movement across digital user interface 34. Horizontal swipe inputs may include rightwards swipe inputs and leftwards swipe inputs. When processing circuitry 52 detects two consecutive rightwards swipe inputs to digital user interface 34, processing circuitry 52 may transition from displaying carousel screen 324 to displaying carousel screen 326 responsive to the first rightwards swipe and transition from displaying carousel screen 326 to displaying carousel screen 328 responsive to the second rightwards swipe.

Processing circuitry 52 may transition from a carousel screen to a respective details screen in response to receiving a tap input to digital user interface 34. When digital user interface 34 is displaying carousel screen 322, processing circuitry 52 may transition digital user interface 34 from displaying carousel screen 322 to displaying details screen 342 responsive to detecting a tap input to digital user interface 34. When digital user interface 34 is displaying carousel screen 324, processing circuitry 52 may transition digital user interface 34 from displaying carousel screen 324 to displaying details screen 344 responsive to detecting a tap input to digital user interface 34. When digital user interface 34 is displaying carousel screen 326, processing circuitry 52 may transition digital user interface 34 from displaying carousel screen 326 to displaying details screen 346 responsive to detecting a tap input to digital user interface 34. When digital user interface 34 is displaying carousel screen 328, processing circuitry 52 may transition digital user interface 34 from displaying carousel screen 328 to displaying details screen 348 responsive to detecting a tap input to digital user interface 34. When digital user interface 34 is displaying carousel screen 330, processing circuitry 52 may transition digital user interface 34 from displaying carousel screen 330 to displaying details screen 350 responsive to detecting a tap input to digital user interface 34. When digital user interface 34 is displaying carousel screen 332, processing circuitry 52 may transition digital user interface 34 from displaying carousel screen 332 to displaying details screen 352 responsive to detecting a tap input to digital user interface 34.

Processing circuitry 52 may transition from displaying a carousel screen to displaying a corresponding idle screen in response to a period of time elapsing since a most recent user input to HVAC controller 30. In some examples, the period of time is 45 seconds. When digital user interface 34 displays carousel screen 322 for a period of time after a most recent user input to HVAC controller 30, processing circuitry 52 may transition to displaying idle screen 302 on digital user interface 34. When digital user interface 34 displays carousel screen 324 for a period of time after a most recent user input to HVAC controller 30, processing circuitry 52 may transition to displaying idle screen 304 on digital user interface 34. When digital user interface 34 displays carousel screen 326 for a period of time after a most recent user input to HVAC controller 30, processing circuitry 52 may transition to displaying idle screen 306 on digital user interface 34. When digital user interface 34 displays carousel screen 328 for a period of time after a most recent user input to HVAC controller 30, processing circuitry 52 may transition to displaying idle screen 308 on digital user interface 34. When digital user interface 34 displays carousel screen 330 for a period of time after a most recent user input to HVAC controller 30, processing circuitry 52 may transition to displaying idle screen 310 on digital user interface 34. When digital user interface 34 displays carousel screen 332 for a period of time after a most recent user input to HVAC controller 30, processing circuitry 52 may transition to displaying idle screen 312 on digital user interface 34.

Processing circuitry 52 of may be configured to cause a set point to change in response to receiving a first rotation input via a dial 32 while digital user interface 34 displays a first screen. In some examples, the first screen includes one of idle screens 302-312 or one of carousel screens 322-332. As such, a default function of dial 32 may be to control one or more set point temperature values. Subsequently, processing circuitry 52 may be configured to cause a menu of options to be displayed on digital user interface 34 to change in response to receiving a touch input at the digital user interface 34 while the digital user interface 34 displays the first screen. In some examples, the first touch input represents a user selection of a menu button on one of carousel screens 322-332, causing digital user interface 34 to display a corresponding one of details screens 342-352.

Processing circuitry 52 is configured to cause a selection being displayed on digital user interface 34 to change in response to receiving a rotation input via dial 32 while digital user interface 34 a second screen. In other words, while digital user interface 34 displays one of details screens 342-352, dial 32 may control the selection being displayed on digital user interface 34 rather than controlling one or more temperature set points. Additionally, processing circuitry 52 may cause the selection being displayed on digital user interface 34 while the digital user interface 34 displays the second screen. In other words, touch input to digital user interface 34 may control the selection being displayed on digital user interface 34 in a similar manner to a rotation of dial 32 while digital user interface 34 displays one of details screens 342-352. Thus, when some screens are being displayed dial 32 and digital user interface 34 may functional as alternative inputs that perform the same function, e.g., navigating a menu hierarchy. When other screens are being displayed, dial 32 and digital user interface 34 may perform different functions. As one example, when an idle screen or home screen is being displayed a rotation of dial 32 may cause a setpoint to change whereas a touch input at digital user interface 34 may cause a menu option to be selected. In some examples, digital user interface 34 is a full color touch screen.

Figure 4:
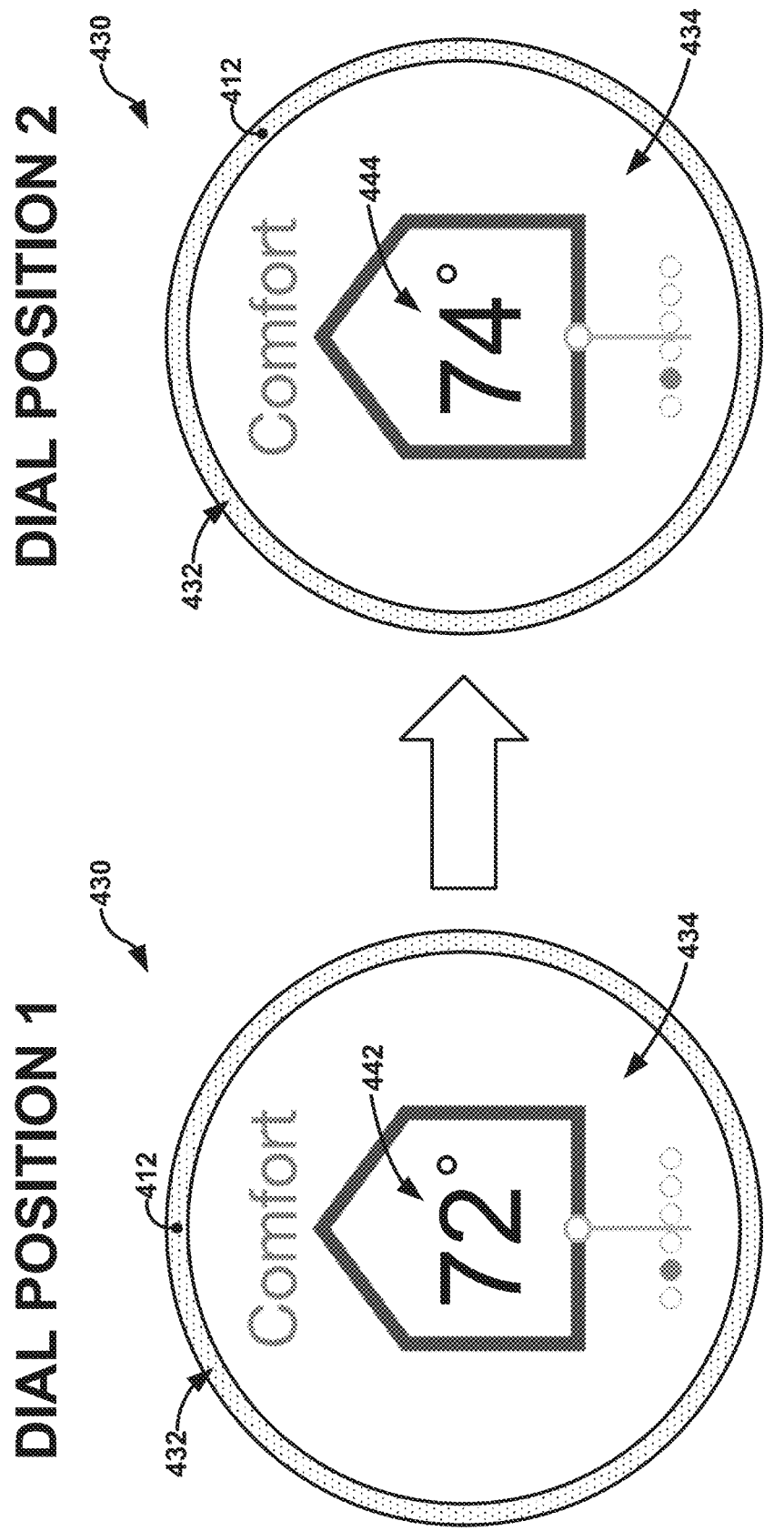
FIG. 4 is a conceptual diagram illustrating a rotation of a dial of an HVAC controller, in accordance with one or more techniques described herein.

FIG. 4 is a conceptual diagram illustrating a rotation of a dial 432 of an HVAC controller 430, in accordance with one or more techniques described herein. As seen in FIG. 4, a first dial position "DIAL POSITION 1" represents a rotational position of dial 432 where point 412 is located at a top of HVAC controller, and a second dial position "DIAL POSITION 2" represents a rotational position of dial 432 the first dial position. Point 412 represents a reference point to show one example rotation of dial 432. Point 412 is not necessarily visible on the face of dial 432. In one example, the clockwise rotation of dial 432 causes processing circuitry of HVAC controller 430 to increase temperature displayed on digital user interface 434 to from 72° to 74°, but this is not required. The processing circuitry may perform one or more other actions in response to detecting the rotation of dial 432.

Figure 5:
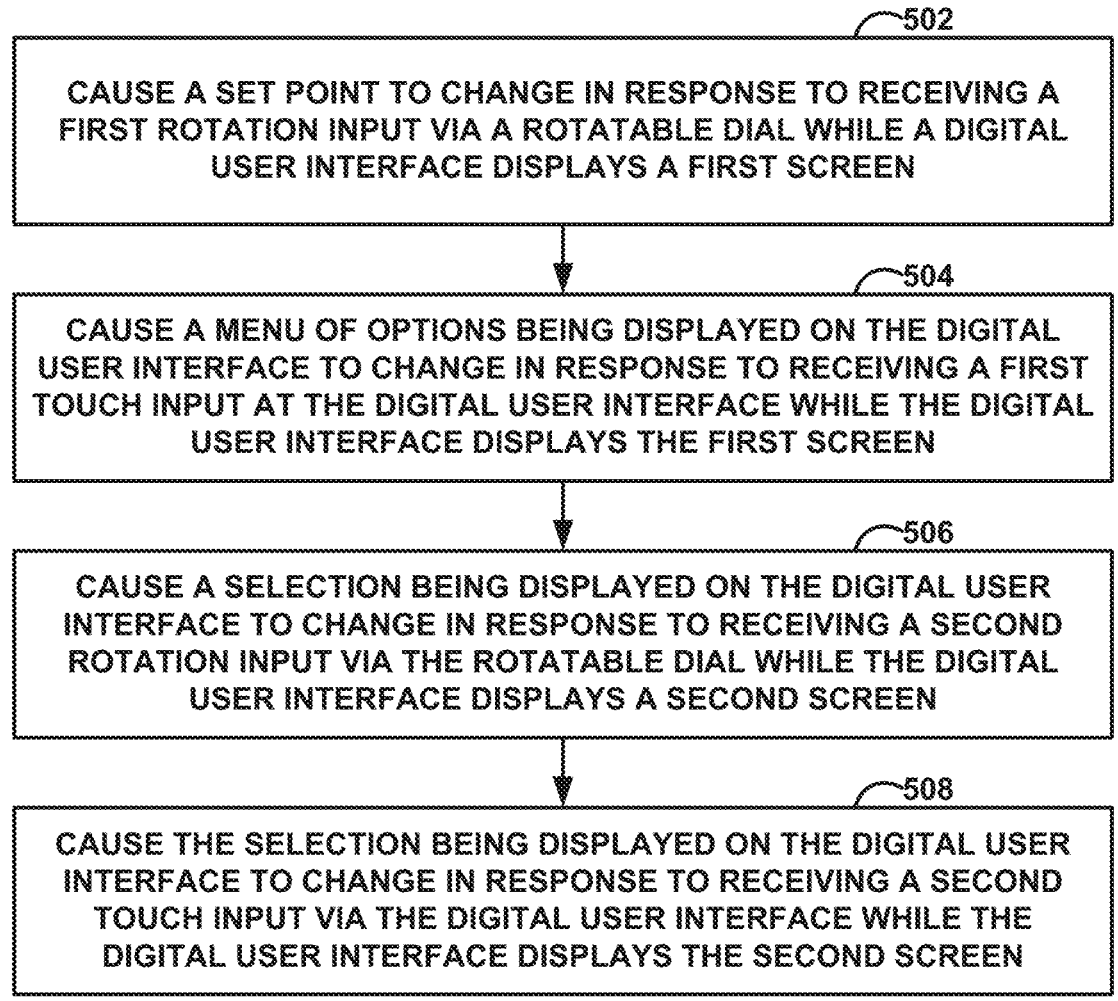
FIG. 5 is a flow diagram illustrating an example operation for navigating a screen displayed by a digital display, in accordance with one or more techniques described herein.

FIG. 5 is a flow diagram illustrating an example operation for navigating a screen displayed by digital user interface 34, in accordance with one or more techniques described herein. FIG. 5 is described with respect to HVAC system 10 and HVAC controller 30 of FIG. 1 and FIG. 2. Additionally, FIG. 5 is described with respect to idle screens 302-312, carousel screens 322-332, and details screens 342-352 of FIG. 3. However, the techniques of FIG. 5 may be performed by different components of HVAC system 10 and HVAC controller 30 or by additional or alternative devices.

Processing circuitry 52 of HVAC controller 30 may be configured to cause a set point to change in response to receiving a first rotation input via a dial 32 while digital user interface 34 displays a first screen (502). In some examples, the first screen includes one of idle screens 302-312 or one of carousel screens 322-332. As such, a default function of dial 32 may be to control one or more set point temperature values. Subsequently, processing circuitry 52 may be configured to cause a menu of options to be displayed on the digital user interface 34 to change in response to receiving a first touch input at the digital user interface 34 while the digital user interface 34 displays the first screen (504). In some examples, the first touch input represents a user selection of a menu button on one of carousel screens 322-332, causing digital user interface 34 to display a corresponding one of details screens 342-352.

Processing circuitry 52 is configured to cause a selection being displayed on the digital user interface 34 to change in response to receiving a second rotation input via the dial 32 while the digital user interface 34 displays a second screen (506). In other words, while digital user interface 34 displays one of details screens 342-352, dial 32 may control the selection being displayed on digital user interface 34 rather than controlling one or more temperature set points. Additionally, processing circuitry 52 may cause the selection being displayed on the digital user interface 34 to change in response to receiving a second touch input via the digital user interface 34 while the digital user interface 34 displays the second screen (508). In other words, touch input to digital user interface 34 may control the selection being displayed on digital user interface 34 in a similar manner to a rotation of dial 32 while digital user interface 34 displays one of details screens 342-352. Thus, when some screens are being displayed dial 32 and digital user interface 34 may functional as alternative inputs that perform the same function, e.g., navigating a menu hierarchy. When other screens are being displayed, dial 32 and digital user interface 34 may perform different functions. As one example, when an idle screen or home screen is being displayed a rotation of dial 32 may cause a setpoint to change whereas a touch input at digital user interface 34 may cause a menu option to be selected. In some examples, the digital user interface 34 includes a full color touch screen.

Figure 6:
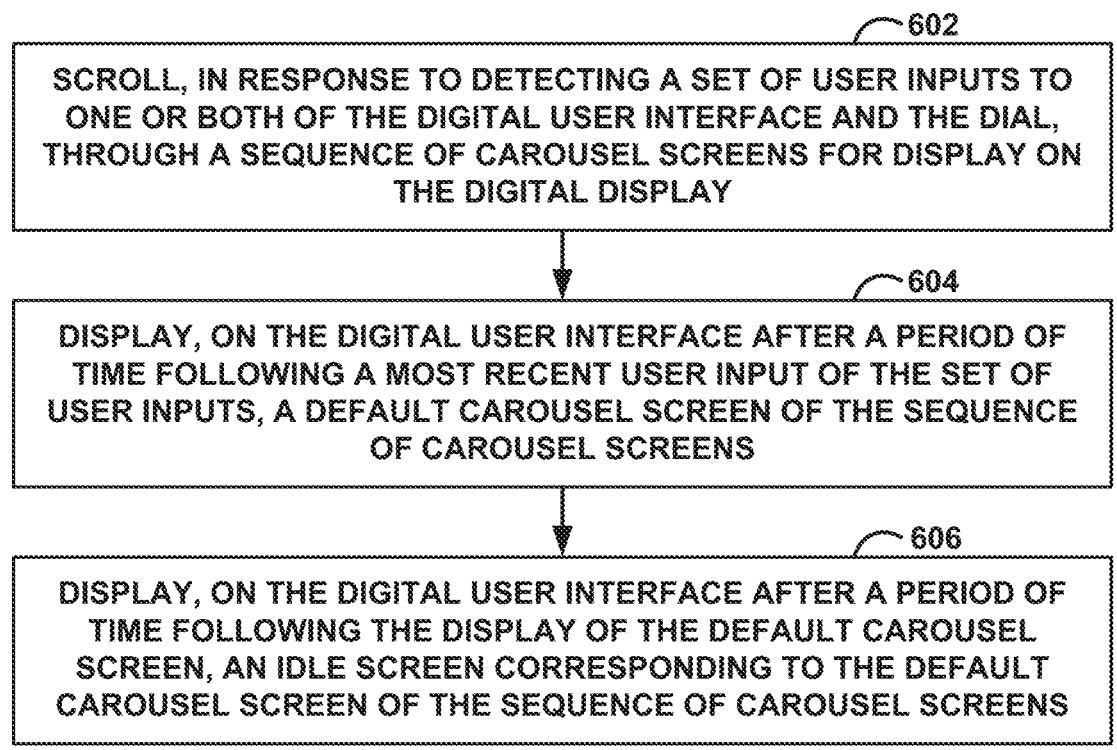
FIG. 6 is a flow diagram illustrating an example operation for navigating one or more screens for display by a digital display, in accordance with one or more techniques described herein.

FIG. 6 is a flow diagram illustrating an example operation for navigating one or more screens for display by digital user interface 34, in accordance with one or more techniques described herein. FIG. 6 is described with respect to HVAC system 10 and HVAC controller 30 of FIG. 1 and FIG. 2. Additionally, FIG. 6 is described with respect to idle screens 302-312, carousel screens 322-332, and details screens 342-352 of FIG. 3. However, the techniques of FIG. 6 may be performed by different components of HVAC system 10 and HVAC controller 30 or by additional or alternative devices. Processing circuitry 52 may be configured to scroll through a sequence of carousel screens 322-332 for display on the digital user interface 34 in response to detecting a set of user inputs to one or both of the digital user interface 34 and the dial 32 (602). Subsequently, digital user interface 34 may display, on the digital user interface 34 after a period of time following a most recent user input of the set of user inputs, a default carousel screen of the sequence of carousel screens (604). Processing circuitry 52 may display, on the digital user interface 34 after a period of time following the display of the default carousel screen, an idle screen corresponding to the default carousel screen of the sequence of carousel screens (606).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" or "processing circuitry," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Various examples have been described. These and other examples are within the scope of the following claims.

What is claimed is:
1. A device comprising:
a rotatable dial;
a digital user interface; and
processing circuitry configured to:
  regulate a temperature within a building based on a setpoint;
  in response to receiving a first rotation input via the rotatable dial while the digital user interface displays a first screen, cause a value for the setpoint of the device to change;

in response to receiving a first touch input at the digital user interface while the digital user interface displays the first screen, cause the digital user interface to transition from displaying the first screen to displaying a second screen including one or more selections,
   wherein the first screen comprises a carousel screen of a sequence of carousel screens,
   wherein the first screen is higher than the second screen within a menu hierarchy,
   wherein the second screen represents a details screen of a set of details screens,
      wherein the details screen includes the one or more selections associated with the carousel screen of the sequence of carousel screens, and
   wherein the first touch input represents a touch input to a touchscreen of digital user interface;
in response to receiving a second rotation input via the rotatable dial while the digital user interface displays the second screen, navigate a menu hierarchy to cause a selection being displayed on the digital user interface to transition through the one or more selections corresponding to the second screen; and
in response to receiving a second touch input via the digital user interface while the digital user interface displays the second screen, navigate the menu hierarchy to cause the selection being displayed on the digital user interface to transition through the one or more selections corresponding to the second screen,
   wherein both of the second rotation input and the second touch input navigate the menu hierarchy to cause the selection being displayed on the digital user interface to transition through the one or more selections corresponding to the second screen, and
   wherein the second touch input represents a swiping motion across the touchscreen of the digital user interface.

2. The device of claim 1, wherein the processing circuitry is configured to display, using the digital user interface, an idle screen of a set of idle screens corresponding to the carousel screen in response to not receiving an input within a period of time.

3. The device of claim 1, wherein the second screen comprises a screen accessed via the first screen.

4. The device of claim 1, wherein the carousel screen is a first carousel screen of the sequence of carousel screens, wherein the first carousel screen represents a default carousel screen and wherein the processing circuitry is further configured to:
   receive information indicative of an instruction to scroll through at least some of the sequence of carousel screens, wherein the scroll ends on a second carousel screen of the sequence of carousel screens; and
   set, after a first period of time following the scroll, the second carousel screen to represent the default carousel screen.

5. The device of claim 4, wherein the processing circuitry is further configured to display, after a second period of time following the scroll, an idle screen of a set of idle screens corresponding to the second carousel screen of the sequence of carousel screens.

6. The device of any of claim 1, wherein the rotatable dial is circular in shape, and wherein the digital user interface is circular in shape.

7. The device of claim 6, wherein the rotatable dial represents a ring which is configured to be located at an outer circumference of the digital user interface, and wherein the rotatable dial is configured to rotate about a center point of the digital user interface while the digital user interface remains fixed.

8. The device of any of claim 1, wherein the processing circuitry is further configured to receive information indicative of the first touch input, wherein the first touch input represents a user input to a menu button of the first screen.

9. A method comprising:
regulating, by processing circuitry of a device, a temperature within a building based on a setpoint;
in response to receiving a first rotation input via a rotatable dial while a digital user interface displays a first screen, causing, by the processing circuitry, a value for the setpoint of the device to change;
in response to receiving a first touch input at the digital user interface while the digital user interface displays the first screen, causing, by the processing circuitry, the digital user interface to transition from displaying the first screen to displaying a second screen including one or more selections,
   wherein the first screen comprises a carousel screen of a sequence of carousel screens, wherein the first screen is higher than the second screen within a menu hierarchy,
   wherein the second screen represents a details screen of a set of details screens,
   wherein the details screen includes the one or more selections associated with the carousel screen of the sequence of carousel screens, and
   wherein the first touch input represents a touch input to a touchscreen of digital user interface;
in response to receiving a second rotation input via the rotatable dial while the digital user interface displays the second screen, navigating a menu hierarchy by causing, by the processing circuitry, a selection being displayed on digital user interface to transition through the one or more selections corresponding to the second screen; and
in response to receiving a second touch input via the digital user interface while the digital user interface displays the second screen, navigating the menu hierarchy by causing, by the processing circuitry, the selection being displayed on the digital user interface to transition through the one or more selections corresponding to the second screen so that both of the second rotation input and the second touch input navigate the menu hierarchy by causing the selection being displayed on the digital user interface to transition through the one or more selections corresponding to the second screen,
   wherein the second touch input represents a swiping motion across the touchscreen of the digital user interface.

10. The method of claim 9, further comprising displaying, by the processing circuitry using the digital user interface, an idle screen of a set of idle screens corresponding to the carousel screen in response to not receiving an input within a period of time.

11. The method of claim 9, wherein the second screen comprises a screen accessed via the first screen.

12. The method of claim 9, wherein the carousel screen is a first carousel screen of the sequence of carousel screens, wherein the first carousel screen represents a default carousel screen and wherein the method further comprises:
   receiving, by the processing circuitry, information indicative of an instruction to scroll through at least some of the sequence of carousel screens, wherein the scroll ends on a second carousel screen of the sequence of carousel screens; and setting, by the processing circuitry after a first period of time following the scroll, the second carousel screen to represent the default carousel screen.

13. The method of claim 12, wherein the method further comprises displaying, by the processing circuitry after a second period of time following the scroll, an idle screen of a set of idle screens corresponding to the second carousel screen of the sequence of carousel screens.

14. The method of claim 9, wherein the rotatable dial is circular in shape, and wherein the digital user interface is circular in shape.

15. The method of claim 9, further comprising receiving, by the processing circuitry, information indicative of the first touch input, wherein the first touch input represents a user input to a menu button of the first screen.

16. A non-transitory computer-readable medium comprising instructions for causing one or more processors to:

regulate a temperature within a building based on a setpoint;

in response to receiving a first rotation input via a rotatable dial while a digital user interface displays a first screen, cause a value of the setpoint of a device to change;

in response to receiving a first touch input at the digital user interface while the digital user interface displays the first screen, cause the digital user interface to transition from displaying the first screen to displaying a second screen including one or more selections, wherein the first screen comprises a carousel screen of a sequence of carousel screens, wherein the first screen is higher than the second screen within a menu hierarchy, wherein the second screen represents a details screen of a set of details screens, wherein the details screen includes the one or more selections associated with the carousel screen of the sequence of carousel screens, and wherein the first touch input represents a touch input to a touchscreen of digital user interface;

in response to receiving a second rotation input via the rotatable dial while the digital user interface displays the second screen, navigate a menu hierarchy to cause a selection being displayed on the digital user interface to transition through the one or more selections corresponding to the second screen; and in response to receiving a second touch input via the digital user interface while the digital user interface displays the second screen, navigate the menu hierarchy to cause the selection being displayed on the digital user interface to transition through the one or more selections corresponding to the second screen so that both of the second rotation input and the second touch input cause the selection being displayed on the digital user interface navigate the menu hierarchy to transition through the one or more selections corresponding to the second screen, wherein the second touch input represents a swiping motion across the touchscreen of the digital user interface.

* * * * *